United States Patent
Ozaki et al.

(10) Patent No.: US 10,221,886 B2
(45) Date of Patent: Mar. 5, 2019

(54) BEARING DEVICE

(71) Applicant: KAMOSEIKO KABUSHIKI KAISHA, Aichi (JP)

(72) Inventors: Masashi Ozaki, Aichi (JP); Kengo Kishi, Aichi (JP)

(73) Assignee: Kamoseiko Kabushiki Kaisha, Aichi (JP)

( * ) Notice: Subject to any disclaimer, the term of this patent is extended or adjusted under 35 U.S.C. 154(b) by 0 days.

(21) Appl. No.: 15/794,341

(22) Filed: Oct. 26, 2017

(65) Prior Publication Data

US 2018/0187718 A1  Jul. 5, 2018

(30) Foreign Application Priority Data

Jan. 5, 2017 (JP) .................. 2017-0000410

(51) Int. Cl.
  F16C 33/48 (2006.01)
  F16C 19/46 (2006.01)
  F16C 33/54 (2006.01)

(52) U.S. Cl.
  CPC .......... F16C 19/463 (2013.01); F16C 33/543 (2013.01); *F16C 2361/61* (2013.01)

(58) Field of Classification Search
  CPC .. F16C 19/463; F16C 19/466; F16C 33/4629; F16C 33/4635; F16C 33/543; F16C 33/546; F16C 2361/61; F16H 19/04; F16H 55/26; F16H 55/28; Y10T 74/1967; Y10T 74/19981
  See application file for complete search history.

(56) References Cited

U.S. PATENT DOCUMENTS

| 3,356,428 A * | 12/1967 | Altson ................... F16C 33/543 |
| | | 384/575 |
| 2013/0031996 A1* | 2/2013 | Imase ..................... F16H 55/10 |
| | | 74/465 |
| 2016/0144888 A1* | 5/2016 | Maier ...................... B62D 3/12 |
| | | 74/109 |

* cited by examiner

*Primary Examiner* — Phillip A Johnson
(74) *Attorney, Agent, or Firm* — Morgan, Lewis & Bockius LLP

(57) ABSTRACT

In a bearing device 1 which is assembled to a pinion 3 of a rack-and-pinion type drive mechanism 2, the bearing device 1 has a plurality of needle rollers 13. A plurality of pin rollers 9 are supported by an inner surface cylindrically formed by the plurality of needle rollers 13. Each of the plurality of needle rollers 13 is held at both ends 13a, 13b in an axial direction R by a retainer cage 14, so as to prevent the needle rollers 13 from being skewed against the axial direction R.

13 Claims, 8 Drawing Sheets

R

VI-VI section enlarged section encircled by VII in Fig. 7

BEARING DEVICE

BACKGROUND OF THE INVENTION

Field of the Invention

The present disclosure relates to a bearing device which is assembled to a pinion of a rack-and-pinion type drive mechanism.

Description of Related Art

In a rack-and-pinion type drive mechanism which is applied to various kinds of machine tools and transfer machines, a pin-roller type pinion has been used with an aim to eliminate the backlash phenomenon as represented by Japanese laid-open patent application No. 2013-36488.

The pin-roller type pinion has a plurality of pin rollers and two support bodies to hold the pin rollers in position. By way of illustration, the pin rollers are in the form of metallic columns, and the support bodies support the pin rollers at both ends in an axial direction, so that the pin rollers are placed in parallel with the pinion along a cylindrical direction.

The drive mechanism actuates the pinion to rotate around its shaft, while at the same time, engaging the pinion as a tooth edge against a rack tooth, so as to advance the rack or rotationally running the pinion along the rack. A bearing device is placed at bores provided with the support bodies so as to rotatably support each of the pin rollers. The bearing device has a plurality of needle rollers and having a retainer cage provided to hold the needle rollers.

The needle rollers are in the shape of metallic columns, and the retainer cage holds the needle rollers in parallel with each other in a cylindrical fashion. The pin rollers are supported by an inner surface which is cylindrically formed by the plurality of needle rollers.

Although Japanese laid-open patent application Nos. 2006-194139 and 2005-16637 disclose a bearing device having the retainer cage and the needle rollers, the bearing device is not assembled to the pinion of the rack-and-pinion type drive mechanism.

In this type of the bearing device, one of the problems to be overcome is to prevent the needle rollers from being skewed advertently while actuating the bearing device.

Therefore, the present invention has been made with the above drawbacks in mind, it is a main object of the invention to prevent the needle rollers from being skewed.

SUMMARY OF THE INVENTION

According to the present disclosure, a bearing device is assembled to a pinion of a rack-and-pinion type drive mechanism. The pinion has two support bodies and a plurality of pin rollers arranged in parallel with each other along an axial direction of the pinion in a cylindrical fashion, so that the plurality of pin rollers are supported at both ends along the axial direction between the two support bodies.

The pinion is structured such as to rotate, while at the same time, engaging the plurality of pin rollers in turn with a tooth of a rack. The bearing device is placed in bores each provided at the support bodies to rotatably support outer surfaces of the pin rollers.

The bearing device has a plurality of needle rollers. A retainer cage is provided to retain the plurality of needle rollers arranged in parallel with each other along the axial direction in a cylindrical fashion. The plurality of pin rollers are supported by an inner surface which is cylindrically formed by the plurality of needle rollers.

Each of the plurality of needle rollers is held at both ends in the axial direction by the retainer cage (14). Such is the structure that the retainer cage potentially effectuates to prevent each of the needle rollers from being inadvertently skewed.

BRIEF DESCRIPTION OF THE DRAWINGS

A preferred form of the present invention is illustrated in the accompanying drawings in which.

DETAILED DESCRIPTION OF PREFERRED EMBODIMENTS

Figure 1:
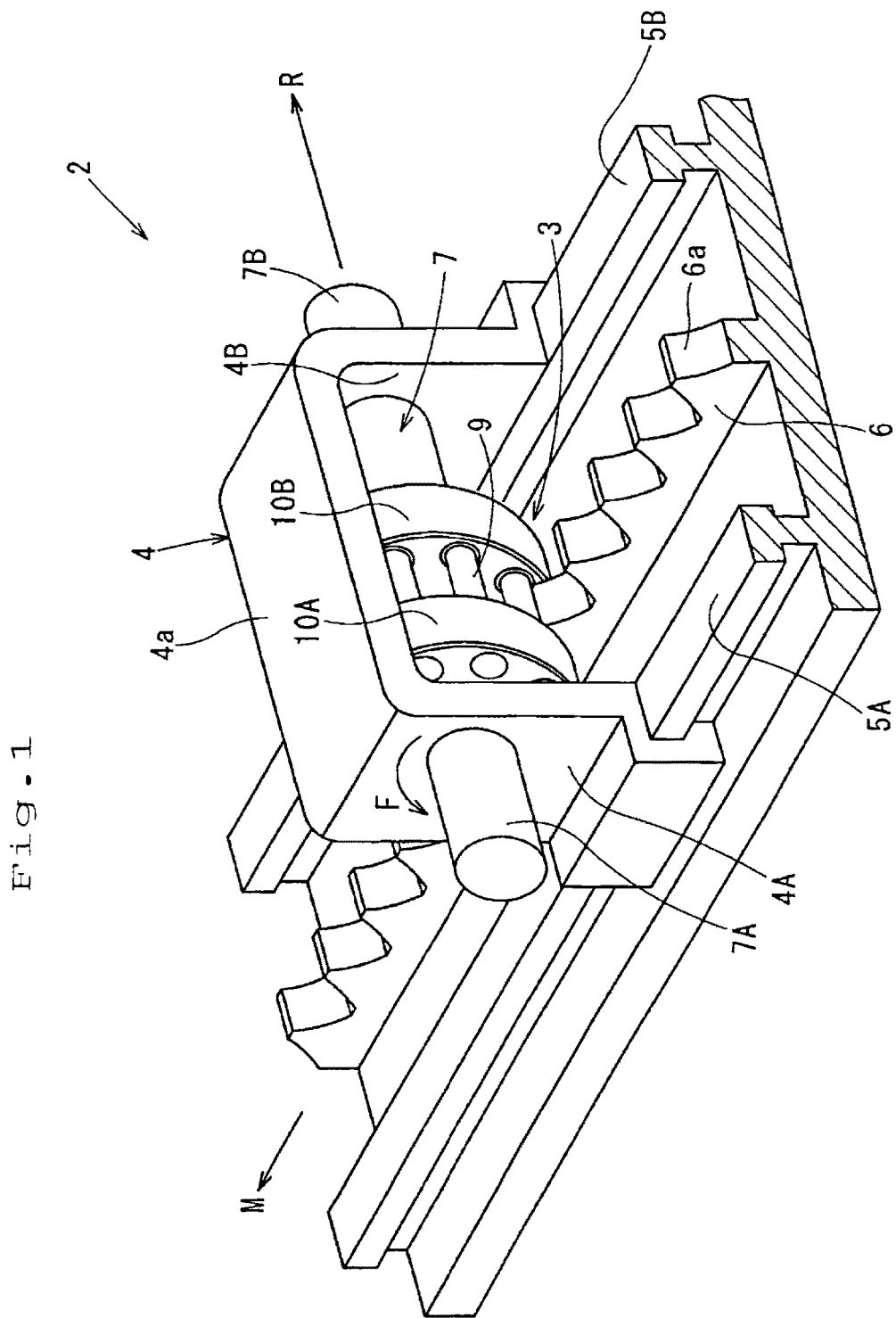
FIG. 1 is a perspective view of a rack-and-pinion type drive mechanism according to a first embodiment of the invention.

In the following description of the depicted embodiments, the same reference numerals are used for features of the same type.

Referring to FIGS. 1 through 9, depicted is a bearing device 1 assembled to a rack-and-pinion type drive mechanism 2 according to a first embodiment of the invention.

The bearing device 1 is attached to a pinion 3 of the rack-and-pinion type drive mechanism 2.

As shown in FIG. 1, the rack-and-pinion type drive mechanism 2 has a housing 4, into which the pinion 3 is accommodated.

The housing 4 is provided to move along two rails 5A, 5B so as to transfer various sorts of products when the rack-and-pinion type drive mechanism 2 is actuated. A rack 6 is provided to be located between the two rails 5A, 5B. The pinion 3 is adapted to rotate around its axial direction R and placed within the housing 4 perpendicular to a lengthwise direction M of the rack 4.

The housing 4 is in the form of a gate-shaped configuration, and having a ceiling portion 4a and outer wall portions 4A, 4B at both sides. The ceiling portion 4a covers an upper part of the pinion 3, and the outer wall portions 4A, 4B are adapted to slide along the rails 5A, 5B.

The rails 5A, 5B are T-shaped in cross section, so that the outer wall portions 4A, 4B are interfit into the rails 5A, 5B outside at a basal end opposite to the ceiling portion 4a.

The pinion 3 has a rotary shaft 7, one end 7A of which is rotationally supported to the one wall portion 4A, and the other end 7B of which is rotationally supported to the other wall portion 4B. An electric motor (not shown) is provided to rotationally actuate the rotary shaft 7 upon energizing to actuate the rack-and-pinion type drive mechanism 2.

When the pinion 3 is subjected to a torque in a rotational direction F, the pinion 3 engaged with a tooth 6a of the rack 6 starts to rotate itself in the rotational direction F to advance in the lengthwise direction M. The tooth 6a has a profile contoured along a cycloidal curve.

Figure 2:
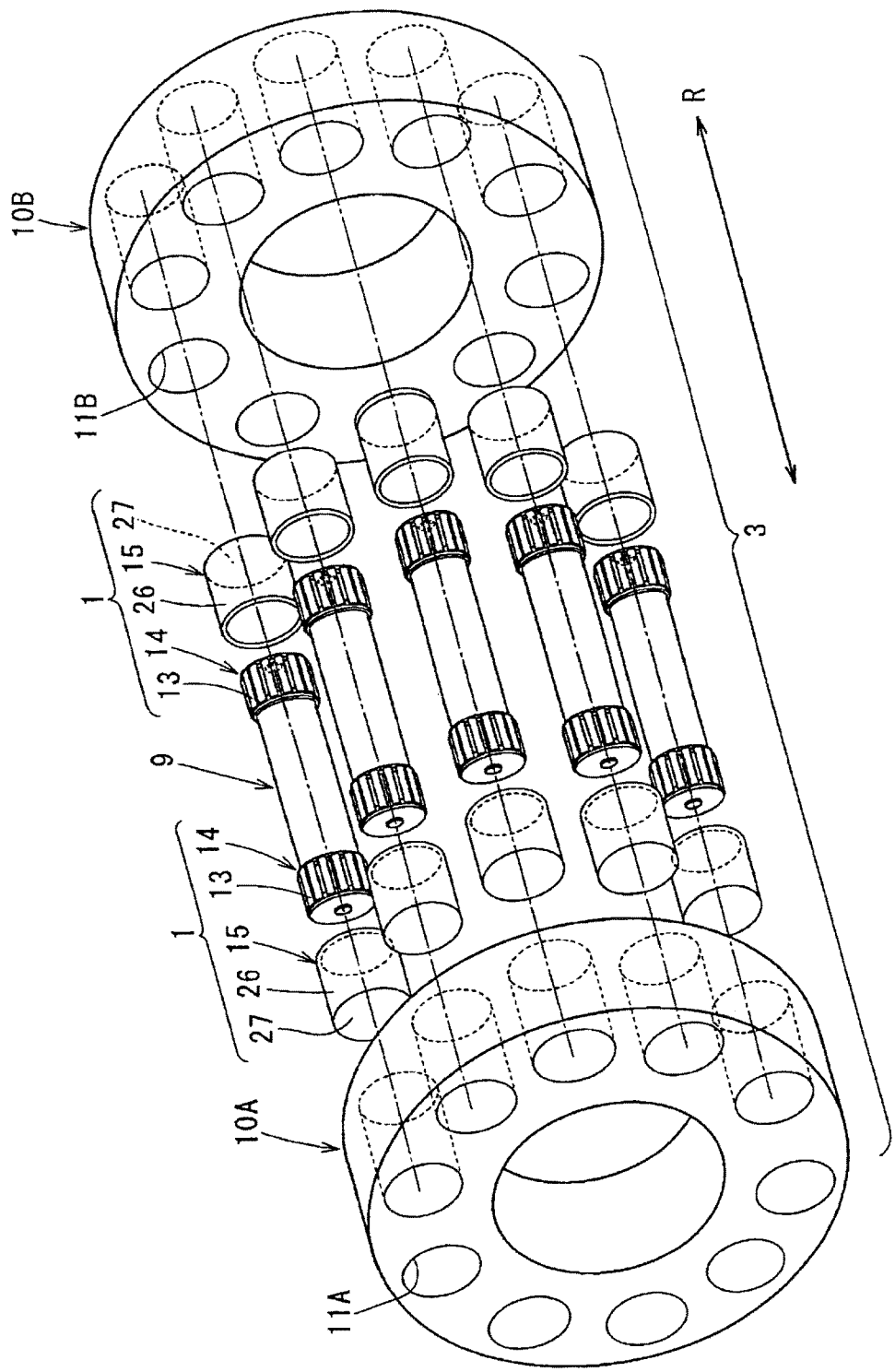
FIG. 2 is an exploded view of the pinion.
Figure 3:
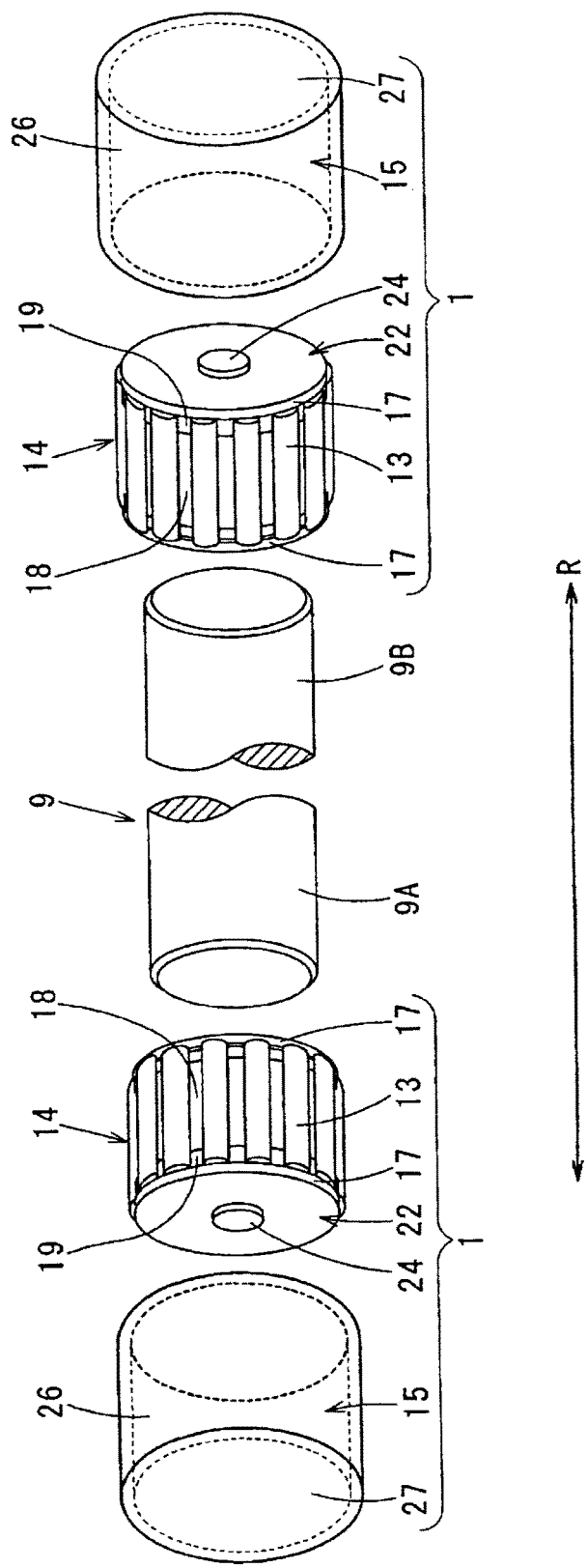
FIG. 3 is an exploded view showing a bearing device together with the pin rollers.

As shown in FIGS. 2 and 3, the pinion 3 has two support bodies 10A, 10B and a plurality of pin rollers 9 arranged in parallel with each other along the axial direction R in a cylindrical fashion, so that the plurality of pin rollers 9 are supported at both ends 9A, 9B along the axial direction R between the two support bodies 10A, 10B. The pin rollers 9 are in the shape of metallic columns.

The pinion 3 is structured such as to rotate, while at the same time, engaging the plurality of pin rollers 9 with the tooth 6a of the rack 6 so as to rotationally advance in the lengthwise direction M.

The bearing device 1 is placed within bores 11A, 11B each provided at the support bodies 10A, 10B at regular intervals in a circumferential direction so as to rotatably support the pin rollers 9 through their outer surfaces.

By way of example, the support bodies 10A, 10B are in the shape of circular plates, and having the bores 11A, 11B, each number of which corresponds to the number of the pin rollers 9. The bores 11A reside predominantly in an outer peripheral side of the support body 10A, and the bores 11B reside predominantly in an outer peripheral side of the support body 10B.

The support bodies 10A, 10B are so arranged that the bores 11A, 11B face each other with the pin rollers 9 bridgedly interposed between the support bodies 10A, 10B.

Namely, each of the pin rollers 9 has one end 9A rotatably supported within the bore 11A through the bearing device 1, and having other end 9B rotatably supported within the bore 11B through the bearing device 1.

As shown in FIGS. 3 through 8, the bearing device 1 has a plurality of needle rollers 13, a retainer cage 14 and a metallic housing 15 as described hereinafter in detail. The needle rollers 13 are in the shape of metallic columns.

As shown evidently in FIG. 3, the bearing device 1 is placed within the corresponding bores 11A, 11B so that the pin rollers 9 are rotatably supported at both ends 9A, 9B.

Figure 4:
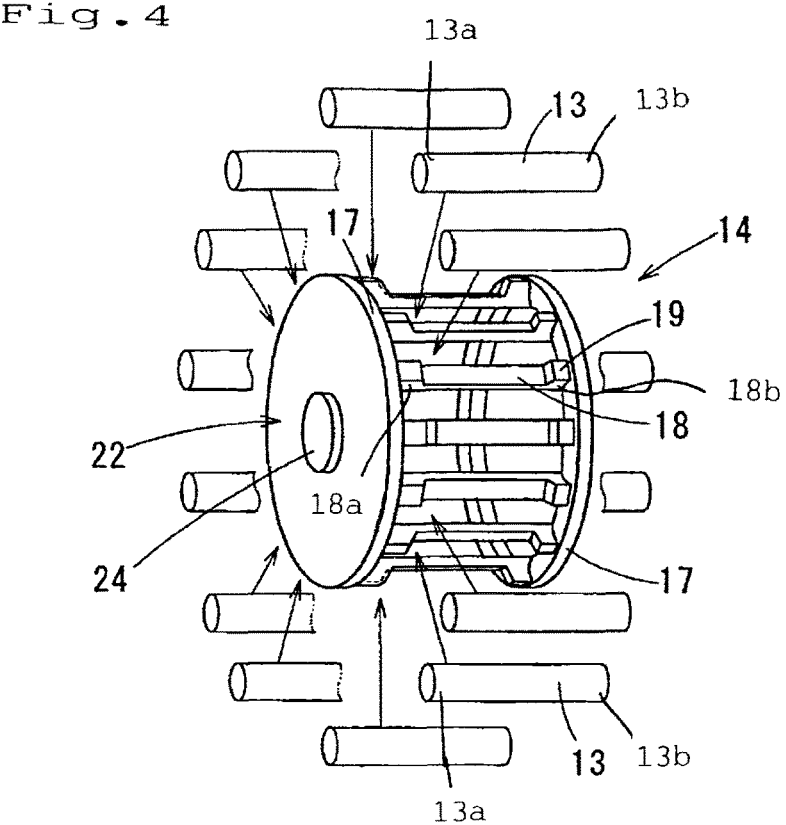
FIG. 4 is an exploded view showing a retainer cage and needle rollers.
Figure 5:
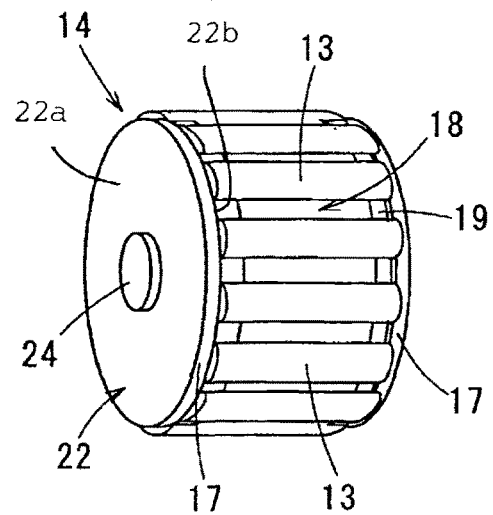
FIG. 5 is a perspective view showing needle rollers assembled to the retainer cage.
Figure 6:
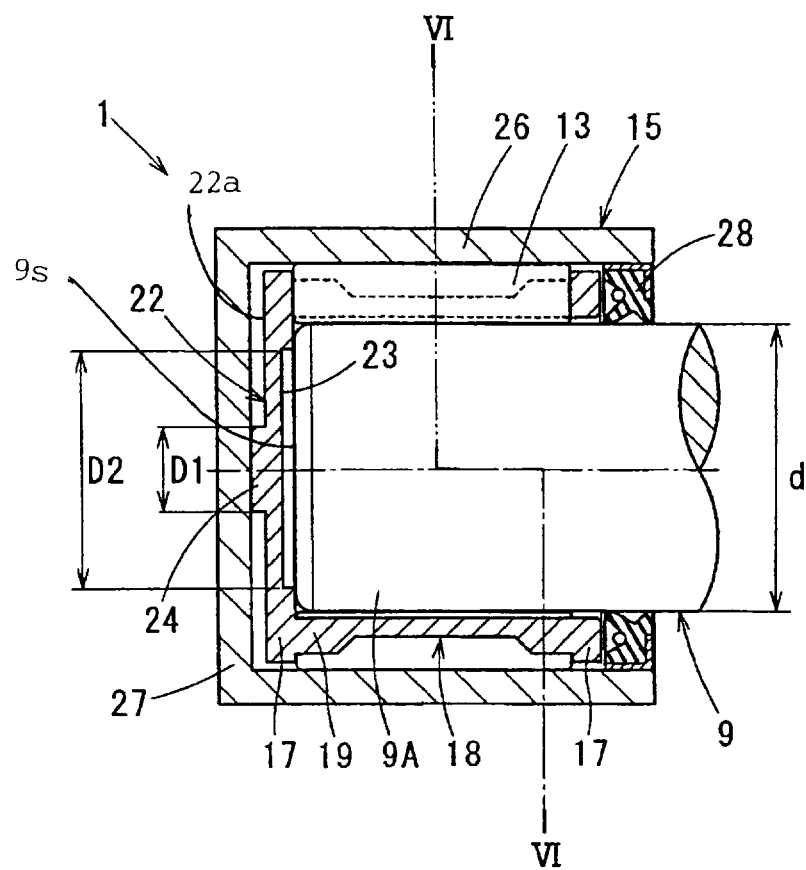
FIG. 6 is a longitudinal cross sectional view of the bearing device.

As shown in FIGS. 4 through 6, a retainer cage 14 is provided to retain the plurality of needle rollers 13 arranged in parallel with each other along the axial direction R in a cylindrical fashion.

The plurality of pin rollers 9 are supported by an inner surface which is cylindrically formed by the plurality of needle rollers 13. Each of the plurality of needle rollers 13 is held at both ends 13a, 13b in the axial direction R by the retainer cage 14.

The retainer cage 14 has two rings 17 at both sides and a plurality of bridge pieces 18 are arranged in parallel with each other between the two rings 17.

Each of the plurality of needle rollers 13 are rotatably accommodated between the neighboring ones among the plurality of bridge pieces 18. Each of the plurality of bridge pieces 18 has both ends 18a, 18b jutted outwardly in a radial direction as protuberances 19.

Figure 7:
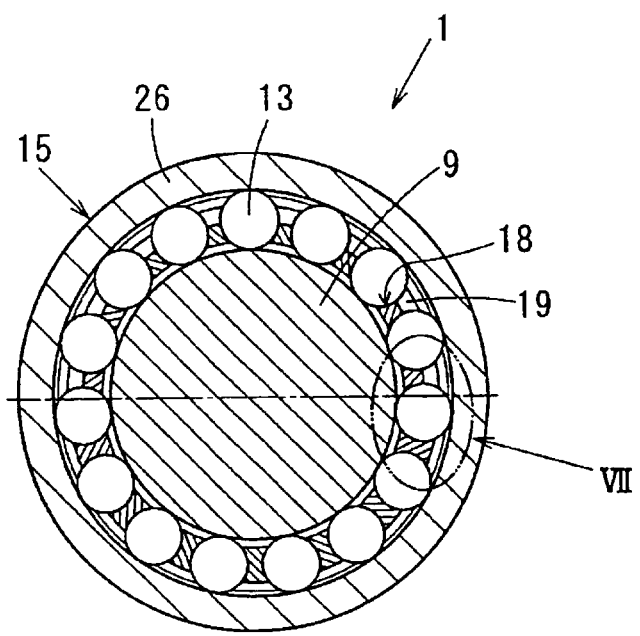
FIG. 7 is a latitudinal cross sectional view along lines VI-VI of FIG. 6.
Figure 8:
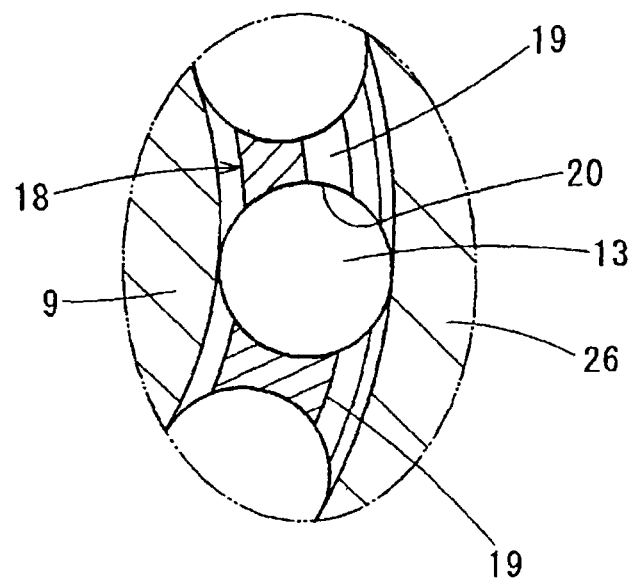
FIG. 8 is an enlarged cross sectional view encircled by a designation VII of FIG. 7.

As shown in FIGS. 6 through 8, each end of the plurality of needle rollers 13 is supportedly interposed between the neighboring ones among the protuberances 19. The mutually opposed protuberances 19 have cylindrical surfaces 20, and each having radius of curvature corresponding to the outer surface of the needle roller 13.

The needle roller 13 has both ends 13a, 13b, each of which is rotatably interfit into the cylindrical surfaces 20 of the mutually opposed protuberances 19 as shown in FIGS. 7 and 8. The needle roller 13 has end surfaces 13a, 13b each engaged in an axial direction with corresponding outer peripheries of the rings 17.

Each of the rings 17 has one open-ended portion closed by a lid plate 22 in the retainer cage 14, and the lid plate 22 has an outer surface 22a and inner surface 22b. The inner surface 22b faces an end surface 9s of the pin roller 9 and having a recess 23 deepened in a direction as being remote from the end surface 9s of the pin roller 9.

The outer surface 22a has a projection 24 extended in a direction as being remote from the end surface 9s of the pin roller 9. The pin roller 9 and the recess 23 together with the projection 24 are concentrically located.

The end surface 9s of the pin roller 9 engages with an outer periphery of the recess 23, a diametrical dimension D2 of which is greater than a diametrical dimension D1 of the projection 24 as described hereinafter in detail.

The lid plate 22 is formed integrally with the retainer cage 14 as a single unit with the use of synthetic resin.

As the synthetic resin, usable are aromatic polyamide (aromatic PA), polyamide 46, polyamide 6, polyamide 66, polyamide-based resin (e.g., nylon: registered trademark), polyphenylenesulphide (PPS), polyetheretherketone (PEEK), polyacetal (polyoxymethylene (POM)), or fluoride-based polytetrafluoroethylene (PTFE).

The retainer cage 14 further may be formed by the synthetic resin selectively adopted from the engineering plastics including polyester, polyimide, polyamide-imide, polycarbonate (PC), polyphenyleneether (PPE), polybutylenetelephthalate (PBT), polyethylenetelephthalate (PET), polyethylene (PE), and syndiotacticpolystyrene (SPS).

In this situation, the vitreous fibers or carbon fibers may be preferably added to each of the above synthetic resins as reinforcements. The reinforcements may be more preferably mixed with the polyamide-related resin within the range of 5-30 wt % so as to render a bending elasticity as 2000-5000 MPa. With the weight percent (wt %) determined as above, it is possible to impart a deformable portion with well-suited deformability and required rigidity.

In a sense to simplify a whole structure, it is to be noted that the lid plate 22 may be omitted as described hereinbefore.

Reverting to FIG. 3, the metallic housing 15 has a cylindrical portion 26 and a closure lid 27, the latter of which closes one open-ended portion of the cylindrical portion 26.

As a whole configuration, the metallic housing 15 is in the form of a bottomed cylinder, and is firmly interfit into each of the bores 11A, 11B so as to accommodate the retainer cage 14 inside the bores 11A, 11B.

Within the bores 11A, 11B, the retainer cage 14 is located so that the lid plate 22 faces the closure lid 27 as shown in FIG. 6. Within the metallic housing 15, the retainer cage 14 is rotatably placed with the needle rollers 13 in contact with an outer surface of the pin roller 9 and an inner surface of the cylindrical portion 26.

The projection 24 is in the shape of thin column, and having a circular end surface which faces an inner surface of the closure lid 27 and positioned perpendicular to the axial direction R.

The circular end surface of the projection 24 is in surface-to-surface contact with the inner surface of the closure lid 27. The recess 23 has a circular opening which traverses perpendicular to the axial direction R. The end surface 9s of the pin roller 9 has an outer periphery which engages with an outer periphery of the recess 23.

The pin roller 9 which is concentrically placed with the projection 24 and the recess 23 determines the dimensional relationship as follows.

The pin roller 9 has a diametrical dimension d greater than both of dimensional legends D1 and D2. The legend D1 is the diametrical dimension of the projection 24, and the legend D2 is the diametrical dimension of the recess 23.

The legend D2 is determined to be greater than the legend D1 (d>D2>D1).

The dimensional relationship between the legends D2, D1 is such that a transmission moment Tm becomes greater than a transmission moment Tn (Tm>Tn) when the pin roller 9 is rotationally driven.

The former moment Tm is the torque transmitted from the pin roller 9 to the lid plate 22, and the latter moment Tn is the torque transmitted from the lid plate 22 to the closure lid 27 through the projection 24. Numeral 28 designates an oil sealant secured near an open-ended portion of the metallic housing 15.

With the structure thus far described, the retainer cage 14 is provided to retain the plurality of needle rollers 13 arranged in parallel with each other along the axial direction R in the cylindrical fashion. The plurality of pin rollers 9 are supported by the inner surface which is cylindrically formed by the plurality of needle rollers 13. Each of the plurality of needle rollers 13 is held at both ends 13a, 13b in the axial direction R by the retainer cage 14.

Such is the structure that the retainer cage 14 effectuates to prevent each of the needle rollers 13 from being inadvertently skewed. This makes it possible to overcome the problems due to the skewing phenomenon.

By way of illustration, it is possible to avoid the temperature rise due to the friction by mutually contacting the needle rollers 13. This also reduces the friction among the needle rollers 13, and avoiding the lubricating grease from being deteriorated, while at the same time, the pin roller 9 is driven with the least amount of vibration and noise.

The retainer cage 14 has two rings 17, and the plurality of bridge pieces 18 is arranged in parallel with each other between the two rings 17.

Each of the plurality of needle rollers 13 is accommodated between the neighboring ones among the plurality of bridge pieces 18. Each of the plurality of bridge pieces 18 has both ends 18a, 18b jutted outwardly in a radial direction as protuberances 19. Each end of the plurality of needle rollers 13 is supportedly interposed between the neighboring ones among the protuberances 19.

Such is the structure that it becomes possible to prevent the needle rollers 13 from being skewed. It also becomes possible to secure a grease-filling space between the neighboring protuberances 19 and at a clearance surrounding an outer surface of the bridge pieces 18.

Further, one open-ended portion of the ring 17 is closed by a lid plate 22 in the retainer cage 14. The lid plate 22 has the inner surface 22b facing the end surface 9s of the pin roller 9 and having a recess 23 deepened in the direction as being remote from the end surface 9s of the pin roller 9. The lid plate 22 has the outer surface 22a having the projection 24 extended in the direction as being remote from the end surface 9s of the pin roller 9.

Furthermore, the pin roller 9 engages its end surface 9s with the outer periphery of the recess 23, the diametrical dimension D2 of which is greater than the diametrical dimension D1 of the projection 24.

This makes it possible to determine the transmission moment Tm to be greater than the transmission moment Tn (Tm>Tn) upon rotationally driving the pin roller 9.

With the relationship (Tm>Tn) between the transmission moments Tm and Tn, it becomes ready to rotate the retainer cage 14 inside the metallic housing 15 in unison with the pin roller 9. This makes it possible to avoid the needle rollers 13 from being skewed, so as to protect the bearing device 1 to be locked.

Since the lid plate 22 is integrally formed with the rings 17 and the plurality of bridge pieces 18 so as to constitute the single unit, it is possible to reduce the number of component parts.

From the reason that each of the needle rollers 13 has both end surfaces 13a, 13b each engaged in the axial direction with the corresponding outer peripheries of the rings 17, it becomes possible to effectively prevent the needle rollers 13 from being skewed.

With the retainer cage 14 formed from the synthetic resin, it is possible to increase the freedom of design. By way of example, this makes it possible to widen the clearance between the neighboring needle rollers 13 by thinning the bridge pieces 18. In comparison with a metallic retainer cage, it becomes possible to reduce the frictional amount between the needle rollers 13 and the retainer cage 14, and further preventing the lubricating grease from being deteriorated.

With the lids plate 22 formed by the synthetic resin, it becomes all the more possible to prevent the lubricating grease from being deteriorated under the condition that the pin roller 9 engages the end surface 9s with the inner surface of the lid plate 22. This also reduces a frictional amount between the end surface 9s and the lid plate 22.

When the anti-skew measure is strengthened, the pin roller 9 has the tendency to increase its axial force. In this sense, it is of greater significance to reduce the frictional amount between the end surface 9s and the lid plate 22, and at the same time, protecting the lubricating grease against deterioration.

Figure 9:
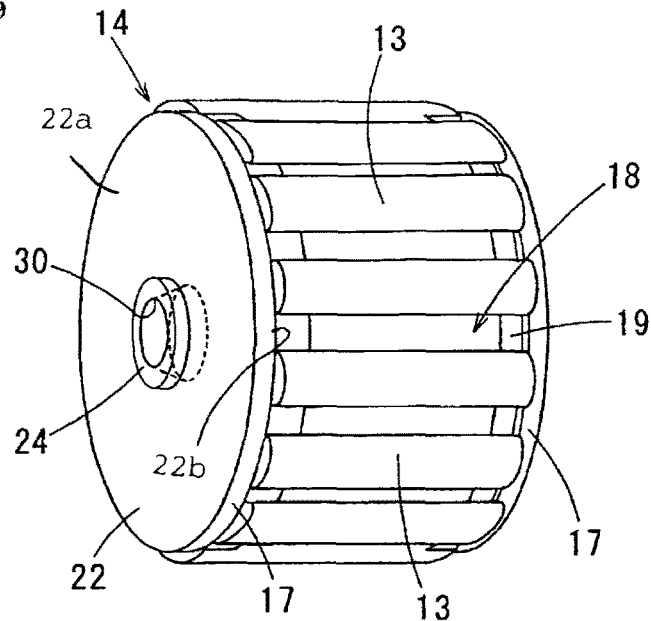
FIG. 9 is a perspective view showing the needle rollers assembled to the retainer cage.
Figure 10:
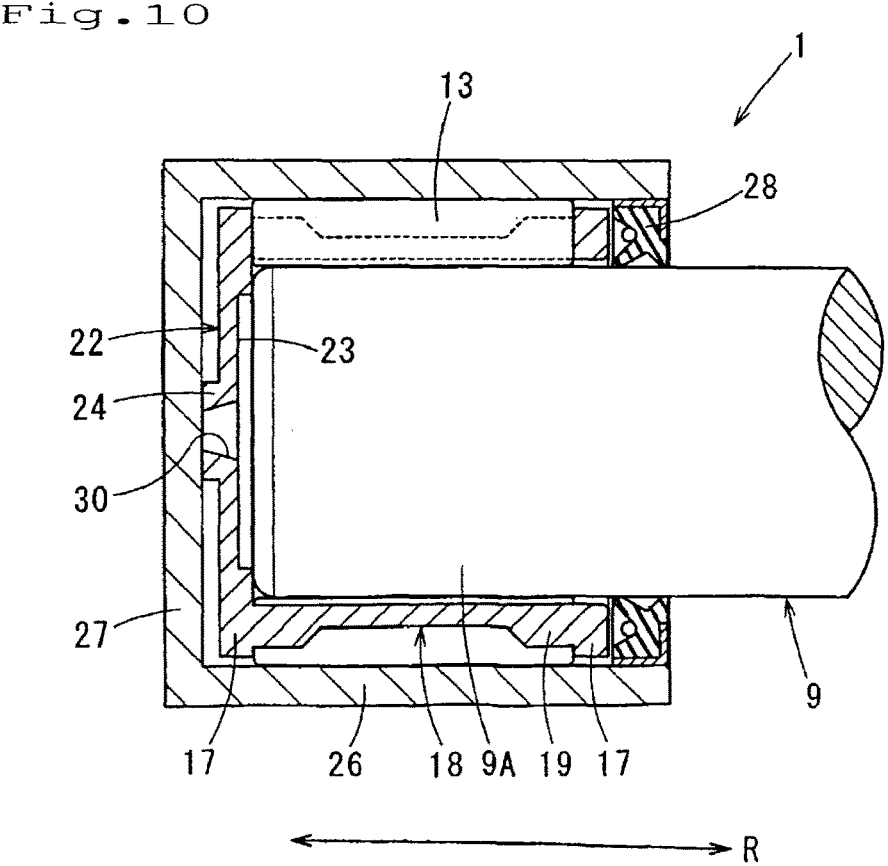
FIG. 10 is a longitudinal cross sectional view of the bearing device according to a second embodiment of the invention.

FIGS. 9 and 10 show a second embodiment of the invention in which the lid plate 22 has a central hole 30 perforated through from the outer surface 22a to the inner surface 22b.

The central hole 30 is arranged to be in concentric relationship with the recess 23 and the projection 24, so that the central hole 30 passes through from a bottom of the recess 23 to the outer end surface of the projection 24. The central hole 30 has an inner surface tapered to be diametrically reduced successively as approaching the closure lid 27, so as form a truncated-cone configuration.

By filling the lubricating grease into the central hole 30, it is possible to release the grease radially from the hole 30 toward the needle rollers 13 to lubricate the needle rollers 13 and the bridge pieces 18 due to the centrifugal force appeared in combination with the rotational movement of the retainer cage 14.

It is to be noted that instead of advancing the pinion 3 along the rack 6, the rack 6 may be advanced in association with the rotational movement of the pinion 3.

In lieu of integrally forming the lid plate 22 with the rings 17 and the bridge pieces 18, the lid plate 22 may be discretely formed from the rings 17 and the bridge pieces 18. The lid plate 22 may be omitted from the retainer cage 14. In place of the synthetic resin, the retainer cage 14 may be made from a metallic material.

In this disclosure, the mutually opposed protuberances 19 have cylindrical surfaces 20, and each having radius of curvature corresponding to that of the outer surface of the needle roller 13.

Instead of the cylindrical surfaces 20, the mutually opposed protuberances 19 may have curved, curled or arcuate surfaces, as long as the protuberances 19 have the radius of curvature corresponding to that of the outer surface of the needle roller 13.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. In a bearing device which is assembled to a pinion of a rack-and-pinion type drive mechanism;
    said pinion comprising two support bodies and a plurality of pin rollers arranged in parallel with each other along an axial direction of said pinion in a cylindrical fashion, so that said plurality of pin rollers are supported at both ends along said axial direction between said two support bodies;
    said pinion being adapted to rotate when engaging said plurality of pin rollers with a tooth of a rack;
    whereby said bearing device being placed within bores each provided at said support bodies to rotatably support said pin rollers;
    said bearing device comprising a plurality of needle rollers;
    a retainer cage provided to retain said plurality of needle rollers arranged in parallel with each other along said axial direction in a cylindrical fashion;
    said plurality of pin rollers being supported by an inner surface which is cylindrically formed by said plurality of needle rollers; and
    each of said plurality of needle rollers being held at both ends in said axial direction by said retainer cage,
    wherein said retainer cage has two rings and a plurality of bridge pieces arranged in parallel with each other between said two rings, each of said plurality of needle rollers being accommodated between the neighboring ones among said plurality of bridge pieces, and each of said plurality of bridge pieces having both ends jutted outwardly in a radial direction as protuberances, each end of said plurality of needle rollers being supportedly interposed between the neighboring ones among said protuberances,
    wherein said protuberances are mutually opposed and have cylindrical surfaces having radius of curvature corresponding to outer surfaces of said plurality of needle rollers; and
    wherein said each end of said plurality of needle rollers is rotatably interfit into a corresponding one of the cylindrical surfaces of the mutually opposed protuberances.

2. The bearing device according to claim 1, wherein said rings have one open-ended portion closed by a lid plate in said retainer cage, and said lid plate has an outer surface and inner surface, said inner surface facing an end surface of said pin roller and having a recess deepened in a direction as being remote from said end surface of said pin roller, and said outer surface having a projection extended in a direction as being remote from said end surface of said pin roller, said pin roller and said recess together with said projection being concentrically located and said end surface of said pin roller engaging with an outer periphery of said recess, a diametrical dimension of which is greater than a diametrical dimension of said projection.

3. The bearing device according to claim 2, wherein said lid plate is integrally formed with said rings and said plurality of bridge pieces so as to constitute a single unit.

4. The bearing device according to claim 2, wherein said lid plate has a central hole perforated through from said outer surface to said inner surface.

5. The bearing device according to claim 2, wherein a metallic housing is provided to accommodate said retainer cage, said metallic housing having a cylindrical portion and a closure lid, the latter of which closes one open-ended portion of said cylindrical portion, said projection having a circular end surface which is in surface-to-surface contact with an inner surface of said closure lid.

6. The bearing device according to claim 1, wherein the both ends of said needle rollers are each engaged in an axial direction with corresponding outer peripheries of said rings.

7. The bearing device according to claim 1, wherein said retainer cage is formed with a synthetic resin.

8. In a bearing device which is assembled to a pinion of a rack-and-pinion type drive mechanism;
    said pinion comprising two support bodies and a plurality of pin rollers arranged in parallel with each other along an axial direction of said pinion in a cylindrical fashion, so that said plurality of pin rollers are supported at both ends along said axial direction between said two support bodies;
    said pinion being adapted to rotate when engaging said plurality of pin rollers with a tooth of a rack;
    whereby said bearing device being placed within bores each provided at said support bodies to rotatably support said pin rollers;
    said bearing device comprising a plurality of needle rollers;
    a retainer cage provided to retain said plurality of needle rollers arranged in parallel with each other along said axial direction in a cylindrical fashion;
    said plurality of pin rollers being supported by an inner surface which is cylindrically formed by said plurality of needle rollers; and
    each of said plurality of needle rollers being held at both ends in said axial direction by said retainer cage,
    wherein said retainer cage has two rings and a plurality of bridge pieces arranged in parallel with each other between said two rings, each of said plurality of needle rollers being accommodated between the neighboring ones among said plurality of bridge pieces, and each of said plurality of bridge pieces having both ends jutted outwardly in a radial direction as protuberances, each end of said plurality of needle rollers being supportedly interposed between the neighboring ones among said protuberances,
    wherein said rings have one open-ended portion closed by a lid plate in said retainer cage, and said lid plate has an outer surface and inner surface, said inner surface facing an end surface of said pin roller and having a recess deepened in a direction as being remote from said end surface of said pin roller, and said outer surface having a projection extended in a direction as being remote from said end surface of said pin roller, said pin roller and said recess together with said projection being concentrically located and said end surface of said pin roller engaging with an outer periphery of said recess, a diametrical dimension of which is greater than a diametrical dimension of said projection.

9. The bearing device according to claim 8, wherein said lid plate is integrally formed with said rings and said plurality of bridge pieces so as to constitute a single unit.

10. The bearing device according to claim 8, wherein the both ends of said needle rollers are each engaged in an axial direction with corresponding outer peripheries of said rings.

11. The bearing device according to claim 8, wherein said lid plate has a central hole perforated through from said outer surface to said inner surface.

12. The bearing device according to claim 8, wherein said retainer cage is formed with a synthetic resin.

13. The bearing device according to claim 8, wherein a metallic housing is provided to accommodate said retainer cage, said metallic housing having a cylindrical portion and a closure lid, the latter of which closes one open-ended portion of said cylindrical portion, said projection having a circular end surface which is in surface-to-surface contact with an inner surface of said closure lid.

\* \* \* \* \*